June 14, 1927.
H. W. EKHOLM
BRAKE BEAM GUIDE
Filed Jan. 21, 1924
1,632,061
2 Sheets-Sheet 1
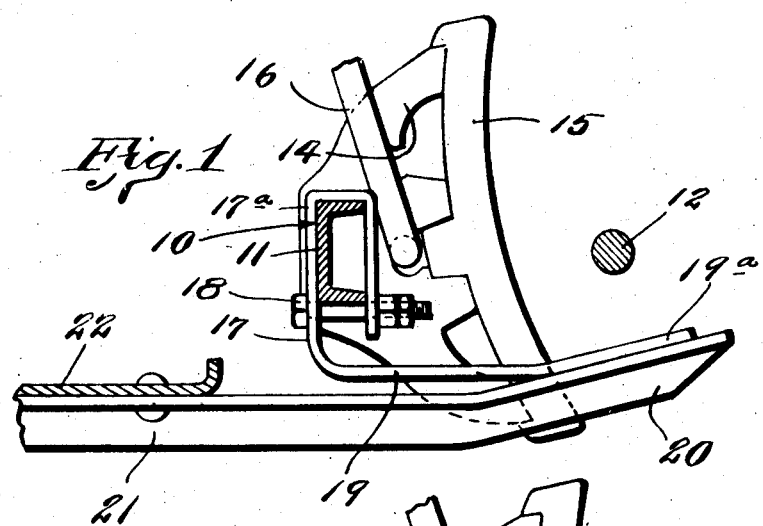
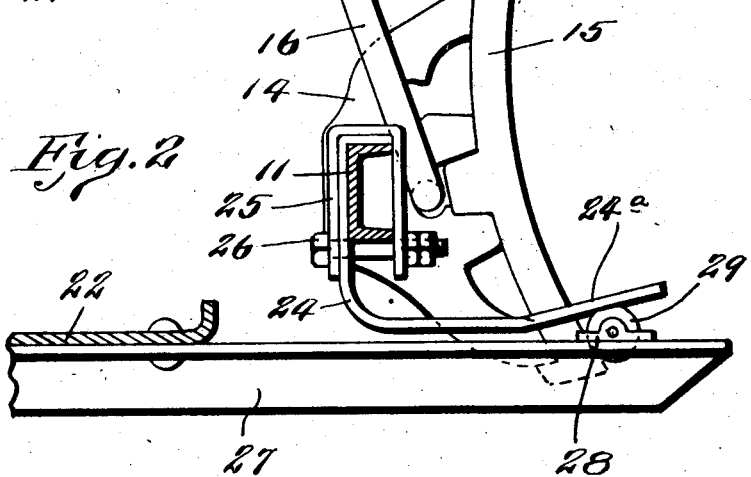
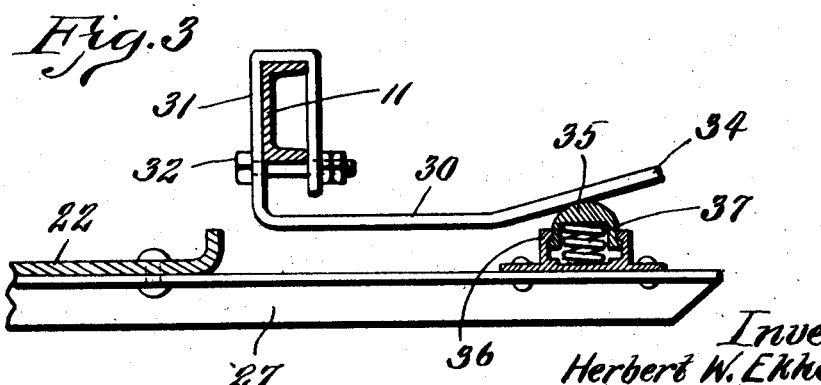
Inventor
Herbert W. Ekholm
By Cornwall, Bedell & Janne
Attys.

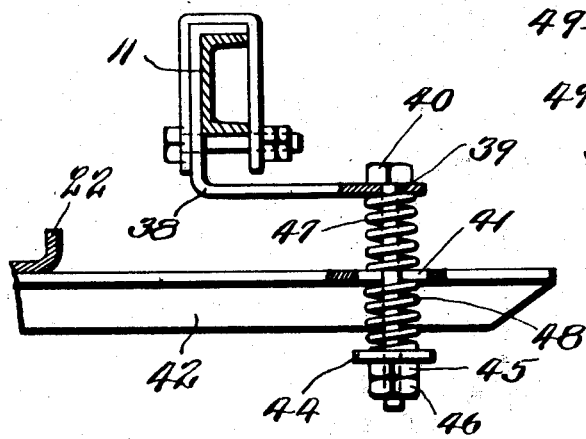
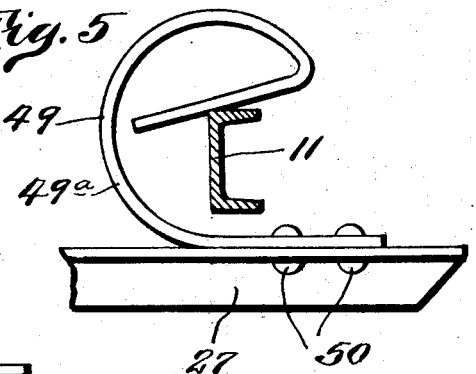
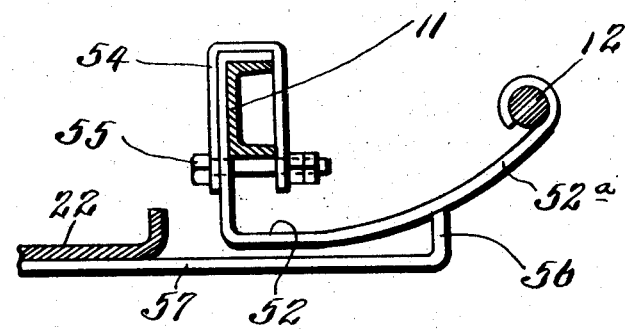
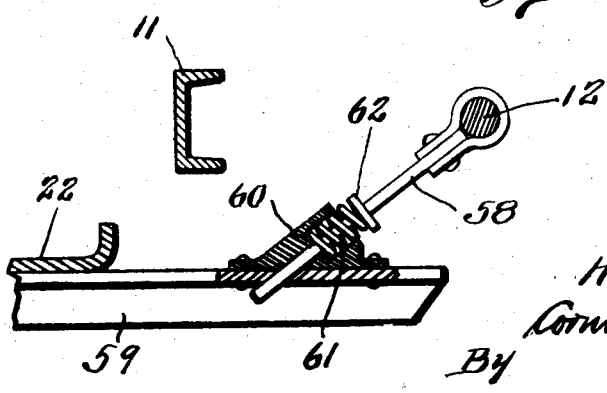

Patented June 14, 1927.

1,632,061

UNITED STATES PATENT OFFICE.

HERBERT W. EKHOLM, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM GUIDE.

Application filed January 21, 1924. Serial No. 687,664.

This invention relates to new and useful improvements in guides and supports for brake beams and the objects of the invention are to provide a guide which can be readily applied in position and which is adapted to cooperate with a fixed part of a truck to maintain the brake beam and parts associated therewith in proper operative positions.

Further objects of the invention are to provide a combined safety guide and support which not only guides the brake beam in its operative movements but also serves as a safety support and prevents the dropping or displacement of the brake beam in case the hangers thereof should break.

Still further objects of the invention are to provide a guide having a flexible or resilient part whereby the brake beam is yieldingly guided in its operative movements and is permitted when necessary to adjust itself in order to maintain the brake shoes in proper position relative to the treads of the wheels.

With these and other objects in view, my invention consists in certain novel features of construction and arrangement of parts, hereinafter more fully described and claimed, and illustrated in the accompanying drawings, in which—

Figure 1 is a transverse cross section through the brake beam and the spring plank and showing the preferred form of a guide.

Figure 2 is a similar view showing a modified form in which the support member is provided with a roller for engaging the guide.

Figure 3 is a modified form showing a rigid guide in sliding contact with means yieldingly arranged on the support.

Figure 4 is a modified form wherein the guide is rigid and has a yielding connection with the support.

Figure 5 shows a modified form in which the guide is fixed to the support and has a sliding engagement with a part of the brake beam.

Figure 6 shows a modified form wherein the guide is rigid and secured to the compression and tension members of the brake beam and has sliding contact with a resilient support member.

Figure 7 shows a modified form in which the guide is connected to the tension member and has a yielding engagement with the support.

The present application relates particularly to guides having their points of engagement with the truck part arranged forwardly of the compression member of the beam or of the point of pivotal connection of the brake beam hanger with the brake head. The truck part forming a support for the guide preferably consists of a member secured to the spring plank and extending therefrom under the beam.

Referring by numerals to the accompanying drawings, 10 indicates a brake beam of standard construction, having a compression member 11, tension member 12, a strut (not shown), brake heads 14 carrying brake shoes 15, and brake hangers 16 engaging said brake heads and supporting the beam in position.

The guide illustrated in Figure 1 consists of an element 17 having one end formed U-shape, as indicated at 17$^a$, for engaging the compression member to which it is clamped by a bolt 18. The lower portion of element 17 extends transversely under the compression member 11, as indicated at 19, and the extreme forward end 19$^a$ is bent angularly to bear against and slide over the upwardly inclined end 20 of a support 21. This support is secured to a part of a car truck such as a spring plank 22 and extends transversely therefrom under the brake beam and the horizontally disposed portion 19 from which it is spaced a suitable distance in order to provide sufficient clearance therebetween so that only the inclined portions 19$^a$ and 20 of the respective parts are in operating sliding contact. The inclination of portion 20 is arranged so that the brake beam guided thereover by the guide element 17 is maintained in proper operative position with respect to the wheels of the truck. Element 17 is preferably formed resilient in order to permit yielding movement of the brake beam when the brake shoes are not in proper relative positions with the treads of the wheels, as, for instance, where the shoes which have been worn wedge-shaped are thin at one end, are replaced in brake heads in reverse positions. When such brake shoes are applied to the wheels considerable yielding of the brake shoe supporting means is necessary and consequently it is desirable to interpose a yielding connection between the fixed part of the truck and the brake beam.

When the brakes are applied, the brake beam moves forwardly and the inclined portion 19ª of element 17 moves forwardly and upwardly on the inclined portion 20 of support 21, thereby assisting the brake beam in maintaining its proper position. Upon release of the brakes the brake beam moves rearwardly and portion 19ª rides rearwardly and downwardly on the inclined portion 20 and thus maintains the brake beam in proper position at all times. The resiliency of member 17 permits adjusting movement of the brake beam without affecting its engagement with the fixed part of the truck.

In the form shown in Figure 2 the guide element 24 is held in position on the compression member by an inverted U-shaped strap 25 which is secured in position by a bolt 26. A support 27 carried by the spring plank is formed straight throughout its length and has mounted near its outer end in suitable bearings 28 a roller 29 over which operates the upwardly inclined forwardly presented end 24ª of guide element 24.

In Figure 3 is illustrated a modified form wherein an element 30 is provided with an inverted U-shaped end 31 which is secured to the compression member by a bolt 32 and the upwardly inclined forward end 34 slides over a projection 35 yieldingly arranged on the support 27. This projection is formed with a convex upper face and is yieldingly mounted in socket member 36 fixed to said support 27 and yieldingly held therein by means of a coil spring 37. Element 30 is rigid and projection 35 forms the yielding connection, permitting adjustment of the brake beam. The angle of inclination of the forward ends of the elements is substantially the same as the angle of movement of the beam when the brakes are applied and released so that the brake beams are guided in their movements by said elements.

In the form illustrated in Figure 4 a rigid guide element 38 is secured to the compression member 11 and its forwardly extending end is apertured, as indicated at 39, and has seated therein a bolt 40 which extends rearwardly through an elongated opening or slot 41 formed in the forward end of a support 42. The lower end of this bolt is threaded and receives a washer 44 which is held in position by a nut 45 and a lock nut 46. A coiled spring 47 is interposed between the support 42 and the forward end of element 38 and a coiled spring 48 is interposed between the underside of support 42 and washer 44. Element 38 is rigid and the springs 47 and 48 yieldingly maintain the brake beam in proper position while bolt 40 serves as a safety device and prevents the displacement of the brake beam in case of breakage of the brake hanger. The elongated opening 41 permits relative movement of bolt 40 during the movement of the brake beam.

In the modified form shown in Figure 5 the element 49 is secured at its lower end by rivets 50 to support 27 and has a curved portion 49ª which extends rearwardly and upwardly over the compression member 11 and has its extreme end bent inwardly as indicated at 51 to form an upwardly inclined track which bears yieldingly against the upper portion of the compression member and serves as a guide therefor during its operating movements. The curved portion 49ª is resilient thereby permitting adjusting movements of the brake beam.

In the modified form shown in Figure 6 the guide element 52 is rigid and is secured at one end to compression member 11 by means of an inverted U-shaped strap 54 and a bolt 55 and has a forwardly and upwardly curved portion 52ª, the extreme end of which is secured to tension member 12. This curved portion rests on the upwardly presented end 56 of a yielding support 57 which is fixed to spring plank 22 and extends transversely therefrom under the brake beam. Sufficient clearance is provided between the horizontal portions of the guide element 52 and the flexible support 57 so as to provide for the varying of the parts and prevents the horizontal portions from coming in contact.

In the modified form shown in Figure 7 an arm 58 is pivotally secured to tension member 12 and extends downwardly and rearwardly therefrom and has its lower end engaging a support 59 at an angle thereto. A socket member 60 is provided on said support and a coiled spring 61 has its one end resting therein while its upper end bears against a collar 62 fixed on rod or arm 58. Thus the brake beam through the interengagement of the compression member and a fixed part of the truck is guided in its operative movements and the spring provides a yielding element for maintaining the brake beam in proper position and permit adjusting movements thereof relative to said fixed part of the truck.

It will be noted that the point of engagement between the fixed truck part and the guiding element is located forward of the point of pivotal support of the brake beam, which is the pivotal interengagement of the brake hangers with brake heads of the beam, and that the interengaging connection between said fixed truck and said beam is formed resilient in order to assist in the proper application of the brake shoes.

Obviously various changes in the construction of my improved brake beam guide could be made and substituted for those herein shown and described without departing from the spirit of my invention.

I claim:

1. A brake beam guide comprising a resilient element adapted to have cooperating engagement with the rear part of a trussed brake beam, and a member adapted to be secured to a part of a truck and extending under said brake beam to form a support for said resilient element.

2. A brake beam guide comprising an element adapted to have cooperating engagement with the compression member of a brake beam and an element adapted to be secured to a part of a truck underlying said brake beam for engaging said first element, one of said elements being flexible to provide a yielding guide for said brake beam.

3. A brake beam guide comprising an element adapted to have cooperating engagement with the compression member of a brake beam, and an element adapted to be secured to a part of a truck for engaging said first element at a point forwardly of said compression member, one of said elements being flexible to form a yielding connection for said brake beam.

4. In a car construction, the combination with a brake beam compression member, of a rigid support extending under said compression member and adapted to be secured to a truck, and a resilient member engaging said support and said compression member and having an inclined portion for guiding said brake beam.

5. In a car construction, the combination with a rear part of a brake beam, of an upwardly and forwardly inclined guide element secured thereto, and a support element secured to a truck part and extending under said inclined element and cooperating therewith, one of said elements being resilient to yieldingly support and guide said beam.

6. In a brake rigging, the combination with a brake beam compression member, of an element adapted to engage said compression member, and a fixed truck part extending under said compression member for engaging said element, said element having an inclined portion for guiding the brake beam in its movements.

7. In a brake rigging, the combination with a brake beam compression member, of a resilient element fixed thereto and extending forwardly thereof, and a fixed member underlying said compression member and engaging said resilient element for guiding said brake beam.

8. A brake beam guide comprising an element adapted to engage the rear part of a brake beam and extending thereunder, and a support fixed to a truck part and engaging said element at a point below and forward of the point of pivotal support of said brake beam for guiding said brake beam.

9. A brake beam guide comprising in combination with a brake beam, including its brake hangers, an element adapted to engage the rear part of said brake beam and guide said brake beam and extending thereunder, and a support fixed to a truck part and engaging said element at a point below and forward of the point of connection of said brake beam with its brake hanger.

In testimony whereof I hereunto affix my signature this 17th day of January, 1924.

HERBERT W. EKHOLM.